United States Patent
Nomoto et al.

(10) Patent No.: US 12,427,604 B2
(45) Date of Patent: Sep. 30, 2025

(54) PROCESSING METHOD AND PROCESSING APPARATUS FOR INGOT

(71) Applicant: DISCO CORPORATION, Tokyo (JP)

(72) Inventors: Asahi Nomoto, Tokyo (JP); Yujiro Sudo, Tokyo (JP); Kazuya Hirata, Tokyo (JP); Kunimitsu Takahashi, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 747 days.

(21) Appl. No.: 17/804,695

(22) Filed: May 31, 2022

(65) Prior Publication Data

US 2022/0395931 A1 Dec. 15, 2022

(30) Foreign Application Priority Data

Jun. 11, 2021 (JP) .................. 2021-098211

(51) Int. Cl.
*B23K 26/38* (2014.01)
*B23K 26/08* (2014.01)
*B23K 101/40* (2006.01)

(52) U.S. Cl.
CPC .......... *B23K 26/38* (2013.01); *B23K 26/0853* (2013.01); *B23K 2101/40* (2018.08)

(58) Field of Classification Search
CPC .. A61K 8/9789; A61Q 19/00; B23K 2101/40; B23K 2103/52; B23K 26/0006;
(Continued)

(56) References Cited

U.S. PATENT DOCUMENTS

2020/0064269 A1  2/2020 Murazawa et al.
2020/0150038 A1* 5/2020 Ito .................. H01L 22/12

FOREIGN PATENT DOCUMENTS

JP   2013100217 A   5/2013
JP   2014040357 A   3/2014
(Continued)

OTHER PUBLICATIONS

Office Action issued in counterpart Japanese patent application No. 2021-098211, dated Jan. 28, 2025.
(Continued)

*Primary Examiner* — Elizabeth M Kerr
*Assistant Examiner* — Adam M Eckardt
(74) *Attorney, Agent, or Firm* — Greer Burns & Crain Ltd.

(57) ABSTRACT

An ingot is processed by applying exciting light, and detecting fluorescence occurring from an upper surface of the ingot. A distribution of the number of photons of the fluorescence on the upper surface of the ingot is stored as two-dimensional data in association with XY coordinate positions, and a Z-coordinate position at which the two-dimensional data is obtained is also stored. A laser beam forms a peeling layer by irradiating the ingot while positioning the condensing point of the laser beam at a depth corresponding to the thickness of a wafer from the upper surface of the ingot. A wafer is separated from the ingot with the peeling layer as a starting point, and three-dimensional data is generated representing the distribution of the number of photons of the fluorescence in the whole of the ingot on the basis of two-dimensional data at each Z-coordinate position of the ingot.

3 Claims, 9 Drawing Sheets

(58) Field of Classification Search
CPC ............... B23K 26/03; B23K 26/0622; B23K 26/0853; B23K 26/38; B23K 26/53; B23K 26/08; B23K 26/00; C30B 29/36; C30B 33/00; C30B 35/00; G01N 1/286; G01N 2001/2866; G01N 2021/8477; G01N 21/6489; G01N 21/9501; G01N 21/64; G01N 1/28; G01N 21/00; H01L 21/02013; H01L 21/02378; H01L 22/12; H01L 22/24; H01L 22/26; H01L 22/34; H01L 21/02; H01L 21/18; H01L 21/268; H01L 21/301; H01L 21/304

See application file for complete search history.

(56) References Cited

FOREIGN PATENT DOCUMENTS

| | | |
|---|---|---|
| JP | 2016111143 A | 6/2016 |
| JP | 2020031134 A | 2/2020 |
| WO | 2019199497 A1 | 10/2019 |

OTHER PUBLICATIONS

Yusuke Hayama et al.; 3D Visualization and Analysis of Dislocation Clusters in Multicrystalline Silicon Ingot by Approach of Data Science; Solar Energy Materials and Solar Cells; vol. 189, pp. 239-244; Jan. 2019; https://doi.org/10.1016/j.solmat.2018.06.008.

* cited by examiner

| | XY COORDINATE POSITION | NUMBER OF PHOTONS(cps) |
|---|---|---|
| DETECTION POSITION 23-1 | x1,y1 | 5000 |
| DETECTION POSITION 23-2 | x2,y2 | 4000 |
| DETECTION POSITION 23-3 | x3,y3 | 2500 |
| DETECTION POSITION 23-4 | x4,y4 | 1000 |
| DETECTION POSITION 23-5 | x5,y5 | 4000 |
| DETECTION POSITION 23-6 | x6,y6 | 5000 |

PROCESSING METHOD AND PROCESSING APPARATUS FOR INGOT

BACKGROUND OF THE INVENTION

Field of the Invention

The present invention relates to a processing method and a processing apparatus for an ingot.

Description of the Related Art

A method of cutting out wafers from a cylindrical semiconductor ingot by using a wire saw is conventionally known as a semiconductor wafer manufacturing method. However, the cutout by the wire saw is not economical because most of the ingot is lost as a kerf loss (cutting margin). In addition, a silicon carbide (SiC) single crystal used as a power device has high hardness, and therefore, it takes time to cut out the SiC single crystal, resulting in poor productivity. In order to solve this, a method has been proposed which slices a plate-shaped work from the ingot by positioning a condensing point of a laser beam within the ingot and scanning the condensing point (see Japanese Patent Laid-Open No. 2016-111143).

A SiC single crystal ingot is generally doped with an impurity such as nitrogen, to be provided with electric conductivity. In a flat region on an atomic level, which region is formed in a SiC single crystal growth process and is referred to as a facet region, for example, nitrogen is captured relatively easily as compared with another part, and therefore, nitrogen concentration is higher than in another region. When the region in which impurity concentration thus differs is present, variation in resistivity occurs within a wafer surface at a time of cutting out a wafer from the ingot, thus causing a decrease in yield of devices. Accordingly, various techniques for growing the crystal while controlling the facet region have been proposed (see Japanese Patent Laid-Open No. 2014-040357 and Japanese Patent Laid-Open No. 2013-100217).

SUMMARY OF THE INVENTION

However, because an inside of the ingot is not uniformly doped with such an impurity, it is difficult to evaluate a state of the inside of the ingot accurately after crystal growth, and it is not possible to perform appropriate feedback to a crystal growth process.

It is accordingly an object of the present invention to provide a processing method and a processing apparatus for an ingot which method and apparatus make it possible to three-dimensionally recognize a facet region having a different impurity concentration within the ingot.

In accordance with an aspect of the present invention, there is provided a processing method for an ingot. The processing method includes a fluorescence detecting step of irradiating the ingot with exciting light of a predetermined wavelength from above the ingot and detecting the number of photons of fluorescence occurring from an upper surface of the ingot, a storing step of storing a distribution of the number of photons of the fluorescence on the upper surface of the ingot, the fluorescence being detected in the fluorescence detecting step, as two-dimensional data in association with XY coordinate positions on an XY plane orthogonal to a height direction of the ingot, and storing a Z-coordinate position at which the two-dimensional data is obtained, the Z-coordinate position being a position in the height direction of the ingot, in association with the two-dimensional data, a laser beam irradiating step of, after the storing step, forming a peeling layer in the ingot by irradiating the ingot with a laser beam of a wavelength transmissible through the ingot while positioning a condensing point of the laser beam at a depth corresponding to a thickness of a wafer to be produced, from the upper surface of the ingot, and moving the condensing point and the ingot relative to each other in an XY direction, a wafer producing step of separating the wafer from the ingot with the peeling layer formed in the laser beam irradiating step, as a starting point, and a three-dimensional data generating step of generating three-dimensional data representing the distribution of the number of photons of the fluorescence in a whole of the ingot, on the basis of two-dimensional data at each Z-coordinate position of the ingot, the two-dimensional data being stored in the storing step, after producing a plurality of wafers from the ingot by repeating the fluorescence detecting step, the storing step, the laser beam irradiating step, and the wafer producing step.

Preferably, the processing method for an ingot further includes a display step of displaying the three-dimensional data.

Preferably, the storing step sets a region in which the number of photons of the fluorescence detected in the fluorescence detecting step is equal to or more than a predetermined value as a non-facet region, sets a region in which the number of photons of the fluorescence is smaller than the predetermined value as a facet region, and stores XY coordinate positions of the non-facet region and the facet region, and the display step displays a boundary between the facet region and the non-facet region in the whole of the ingot.

In accordance with another aspect of the present invention, there is provided a processing apparatus for producing a plurality of wafers from an ingot. The processing apparatus includes a holding unit having a holding surface configured to hold the ingot, a fluorescence detecting unit configured to irradiate the ingot with exciting light of a predetermined wavelength from above the ingot, and detect the number of photons of fluorescence occurring from an upper surface of the ingot, a laser beam irradiating unit configured to form a peeling layer by irradiating the ingot with a laser beam of a wavelength transmissible through the ingot while positioning a condensing point of the laser beam at a depth corresponding to a thickness of a wafer to be produced, from the upper surface of the ingot, a moving unit configured to move the holding unit and the condensing point of the laser beam relative to each other in an XY direction parallel with the holding surface, and a control unit, the control unit including a storage section configured to store a distribution of the number of photons of the fluorescence on the upper surface of the ingot, the fluorescence being detected in the fluorescence detecting unit, as two-dimensional data in association with XY coordinate positions on an XY plane parallel with the holding surface, and store a Z-coordinate position at which the two-dimensional data is obtained, the Z-coordinate position being a position in a height direction of the ingot, in association with the two-dimensional data, and a three-dimensional data generating section configured to generate three-dimensional data representing the distribution of the number of photons of the fluorescence in a whole of the ingot, on a basis of two-dimensional data at each Z-coordinate position of the ingot, the two-dimensional data being stored in the storage section.

Preferably, the processing apparatus further includes a display unit configured to display the three-dimensional data.

Preferably, the storage section sets a region in which the number of photons of the fluorescence detected in the fluorescence detecting unit is equal to or more than a predetermined value as a non-facet region, sets a region in which the number of photons of the fluorescence is smaller than the predetermined value as a facet region, and stores XY coordinate positions of the non-facet region and the facet region, and the display unit displays a boundary between the facet region and the non-facet region in the whole of the ingot.

According to the present invention, it is possible to three-dimensionally recognize the facet region having a different impurity concentration within the ingot.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Embodiments of the present invention will hereinafter be described in detail with reference to the drawings. The present invention is not limited by contents described in the following embodiments. In addition, constituent elements described in the following include constituent elements readily conceivable by those skilled in the art and essentially identical constituent elements. Further, configurations described in the following can be combined with each other as appropriate. In addition, various omissions, replacements, or modifications of configurations can be performed without departing from the spirit of the present invention.

A processing method and a processing apparatus 100 for an ingot 10 according to an embodiment of the present invention will be described with reference to the drawings. The processing method for the ingot 10 according to the embodiment is a method that, by using the processing apparatus 100 depicted in FIG. 3 and FIG. 4, produces a plurality of wafers 30 depicted in FIG. 13 and the like from the ingot 10 depicted in FIG. 1 and FIG. 2, and generates three-dimensional data regarding a facet region 21 within the ingot 10 depicted in FIG. 14.

(Ingot)

Figure 1:
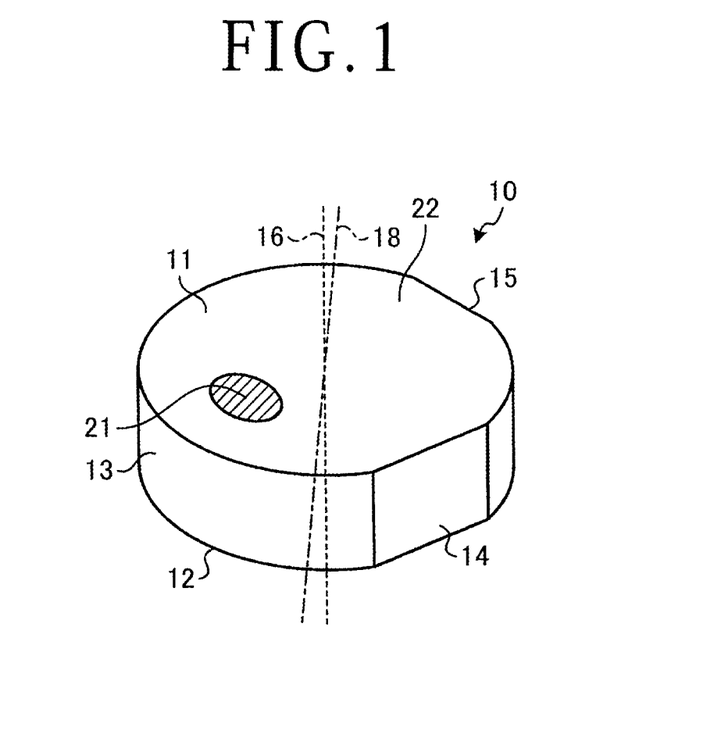
FIG. 1 is a perspective view of an ingot to be processed by a processing method for the ingot according to an embodiment of the present invention.
Figure 2:
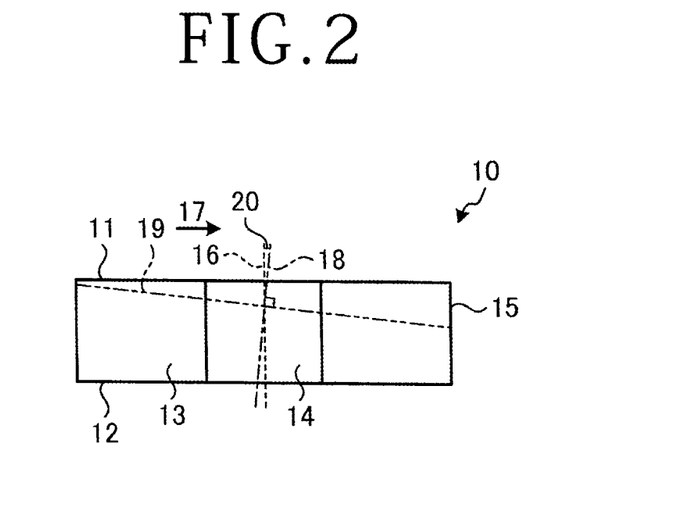
FIG. 2 is a side view of the ingot depicted in FIG. 1.

Description will first include a configuration of the ingot 10 to be processed by the processing method for the ingot 10 according to the embodiment of the present invention. FIG. 1 is a perspective view of the ingot 10 to be processed by the processing method for the ingot 10 according to the embodiment. FIG. 2 is a side view of the ingot 10 depicted in FIG. 1.

The ingot 10 according to the embodiment which ingot is depicted in FIG. 1 and FIG. 2 includes silicon carbide and is formed in a cylindrical shape as a whole. The ingot 10 in the embodiment is a hexagonal single crystal SiC ingot. The ingot 10 has a first surface 11, a second surface 12, a peripheral surface 13, a first orientation flat 14, and a second orientation flat 15.

The first surface 11 is of a circular shape, and is one end surface of the ingot 10 formed in a cylindrical shape. The first surface 11 corresponds to the upper surface of the ingot 10. The second surface 12 is of a circular shape and is an end surface of the ingot 10 formed in a cylindrical shape which end surface is on a side opposite from the first surface 11. The second surface 12 corresponds to the bottom surface of the ingot 10. The peripheral surface 13 is a surface connected to an outer edge of the first surface 11 and an outer edge of the second surface 12.

The first orientation flat 14 is a flat surface formed in a part of the peripheral surface 13 in order to indicate the crystal orientation of the ingot 10. The second orientation flat 15 is a flat surface formed in a part of the peripheral surface 13 in order to indicate the crystal orientation of the ingot 10. The second orientation flat 15 is orthogonal to the first orientation flat 14. Incidentally, a length of the first orientation flat 14 is longer than a length of the second orientation flat 15.

In addition, the ingot 10 has a c-axis 18 inclined by an off angle 20 in an inclination direction 17 toward the second orientation flat 15 with respect to a normal 16 to the first surface 11 and a c-plane 19 orthogonal to the c-axis 18. The inclination direction 17 of the c-axis 18 from the normal 16 is orthogonal to the extending direction of the second orientation flat 15 and is parallel with the first orientation flat 14. The c-plane 19 is inclined by the off angle 20 with respect to the first surface 11 of the ingot 10.

An infinite number of c-planes 19 are set in the ingot 10 on a molecular level of the ingot 10. The off angle 20 of the ingot 10 in the embodiment is set to 1°, 4°, or 6°. However, the ingot 10 in the present invention may be manufactured with the off angle 20 set freely in a range of 1° to 6°, for example. The first surface 11 of the ingot 10 is subjected to grinding processing by a grinding apparatus and is thereafter subjected to polishing processing by a polishing apparatus. The first surface 11 is consequently formed into a mirror surface.

In addition, the ingot 10 according to the embodiment is formed mainly as a hexagonal single crystal SiC ingot. However, the facet region 21 is locally present in the ingot 10 according to the embodiment. The facet region 21 is formed in a columnar shape from the first surface 11 to the second surface 12 of the ingot 10 (see FIG. 14). The facet region 21 relatively tends to capture nitrogen as compared with a non-facet region 22 other than the facet region 21. Therefore, nitrogen concentration in the facet region 21 is higher than in other regions.

(Processing Apparatus)

Figure 3:
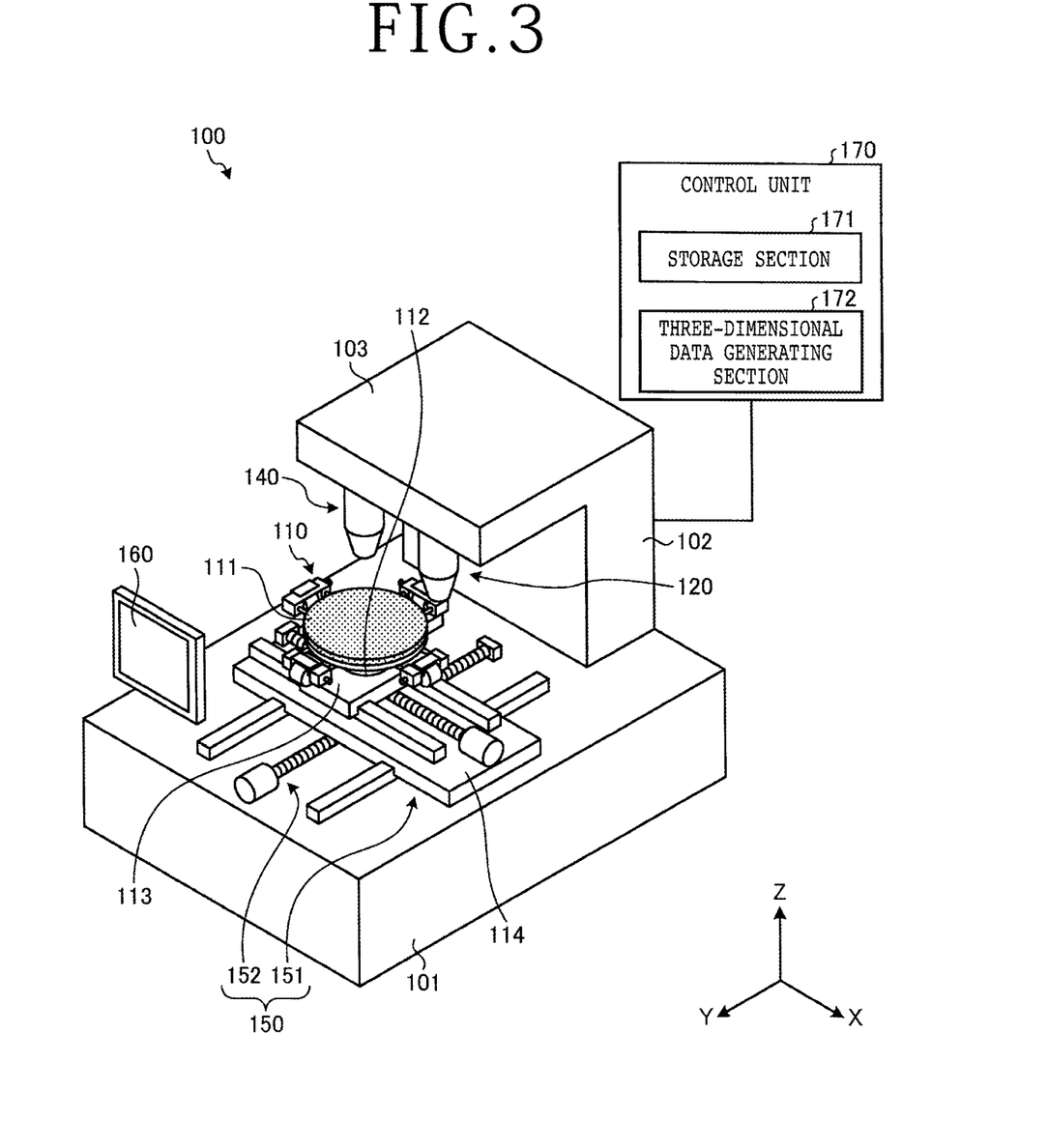
FIG. 3 is a perspective view depicting an example of a configuration of a processing apparatus according to the embodiment.
Figure 4:
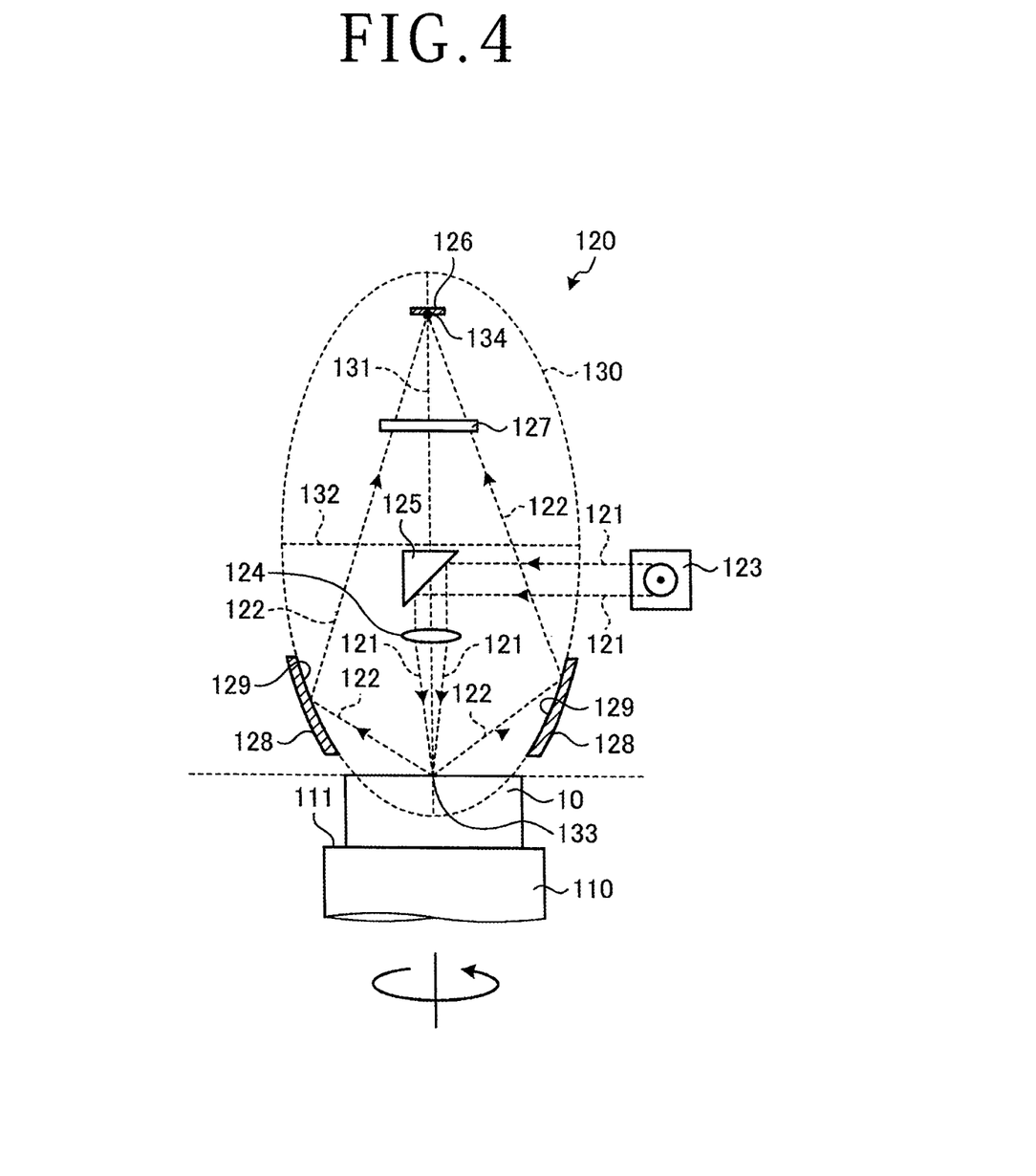
FIG. 4 is a schematic diagram depicting a general configuration of a fluorescence detecting unit of the processing apparatus depicted in FIG. 3.

A configuration of the processing apparatus 100 according to the embodiment of the present invention will next be described. FIG. 3 is a perspective view depicting an example of a configuration of the processing apparatus 100 according to the embodiment. FIG. 4 is a diagram of assistance in explaining a general configuration of a fluorescence detecting unit 120 of the processing apparatus 100 depicted in FIG. 3. In the following description, an X-axis direction is one direction in a horizontal plane. A Y-axis direction is a direction orthogonal to the X-axis direction in the horizontal plane. A Z-axis direction is a direction orthogonal to the X-axis direction and the Y-axis direction. The processing apparatus 100 according to the embodiment includes a holding unit 110, the fluorescence detecting unit 120, a laser beam irradiating unit 140, a moving unit 150, a display unit 160, and a control unit 170.

The holding unit 110 holds the ingot 10 by a holding surface 111. The holding surface 111 is of a disk shape including porous ceramic or the like. The holding surface 111 in the embodiment is a flat surface parallel with a horizontal direction. The holding surface 111 is, for example, connected to a vacuum suction source via a vacuum suction path. The holding unit 110 sucks and holds the ingot 10 mounted on the holding surface 111.

The holding unit 110 is rotated by a rotating unit 112 about an axis parallel with the Z-axis direction. The rotating unit 112 is supported by an X-axis direction moving plate 113. The rotating unit 112 and the holding unit 110 are moved in the X-axis direction by the moving unit 150 via the X-axis direction moving plate 113. The rotating unit 112 and the holding unit 110 are moved in the Y-axis direction by the moving unit 150 via the X-axis direction moving plate 113 and a Y-axis direction moving plate 114.

The fluorescence detecting unit 120 is a unit that irradiates the ingot 10 held on the holding surface 111 of the holding unit 110 with exciting light 121 of a predetermined wavelength from above the ingot 10, and detects fluorescence 122 occurring from the upper surface of the ingot 10. A part of the fluorescence detecting unit 120 is supported by a distal end of a support beam 103 extended in the horizontal direction from an upper end portion of an erected wall 102 erected from an apparatus main body 101. As depicted in FIG. 4, the fluorescence detecting unit 120 includes an exciting light source 123, a condensing lens 124, an exciting light reflecting mirror 125, a light receiving unit 126, a band-pass filter 127, and a fluorescence reflecting mirror 128.

The exciting light source 123 applies the exciting light 121 having a wavelength absorbed by the ingot 10. The exciting light source 123, for example, includes a gallium nitride (GaN) based light emitting element.

The condensing lens 124 condenses and applies the exciting light 121 applied from the exciting light source 123 to the upper surface (first surface 11) of the ingot 10 held on the holding surface 111 of the holding unit 110. The condensing lens 124 in the embodiment is disposed between the exciting light reflecting mirror 125 and the ingot 10. However, the condensing lens 124 in the present invention may be disposed between the exciting light source 123 and the exciting light reflecting mirror 125.

The exciting light reflecting mirror 125 reflects the exciting light 121 applied from the exciting light source 123 and guides the exciting light 121 to the upper surface (first surface 11) of the ingot 10 held on the holding surface 111 of the holding unit 110. The exciting light reflecting mirror 125 in the embodiment reflects the exciting light 121 applied from the exciting light source 123 to the condensing lens 124.

The light receiving unit 126 detects the number of photons of the fluorescence 122 occurring from the upper surface of the ingot 10. The light receiving unit 126, for example, includes a high sensitivity light detector that converts light energy into electric energy by using a photoelectric effect, and has a current amplifying (electron multiplying) function added thereto. The light receiving unit 126 is, for example, disposed in a vacuum region demarcated by a glass tube. The light receiving unit 126 receives photoelectrons (photons) of the fluorescence 122 passed through the glass tube, and outputs an electric signal indicating the number of photons of the fluorescence 122. The photoelectrons of the fluorescence 122 received by the light receiving unit 126 generate secondary electrons one after another by collision of the photoelectrons, and thus amplify current.

The band-pass filter 127 is disposed in a stage preceding the light receiving unit 126. The band-pass filter 127 passes light of a predetermined wavelength of the fluorescence 122 occurring from the upper surface of the ingot 10, and removes light of a wavelength other than the predetermined wavelength of the fluorescence 122. Hence, even when a part of the exciting light 121 is scattered and goes toward the light receiving unit 126, for example, the exciting light 121 is removed by the band-pass filter 127.

The fluorescence reflecting mirror 128 reflects the fluorescence 122 occurring from the upper surface of the ingot 10 to the light receiving unit 126. The fluorescence reflecting mirror 128 is a spheroidal mirror in which a reflecting surface 129 is formed by a part of a curved surface of a spheroid obtained by rotation of an ellipse 130 having a major axis 131 extending in a vertical direction and a minor axis 132 orthogonal to the major axis 131 about the major axis 131.

The elliptical mirror is known to have a characteristic of having two focal points, so that light going out from one focal point is reflected by the inner surface of the elliptical mirror and then reaches the other focal point. The elliptical mirror forming the spheroid in the embodiment has a first focal point 133 and a second focal point 134. A part where the upper surface of the ingot 10 is irradiated with the exciting light 121 is disposed at the position of the first focal point 133. The light receiving unit 126 is disposed at the second focal point 134.

According to such a configuration, when the exciting light 121 is applied to the upper surface of the ingot 10 which upper surface is located at the first focal point 133, the fluorescence 122 is emitted from the upper surface of the ingot 10 due to the exciting light 121. The fluorescence 122 is reflected by the reflecting surface 129 formed by a part of the spheroid, is condensed to the second focal point 134, and is received by the light receiving unit 126 disposed at the second focal point 134.

Consequently, the fluorescence 122 emitted from the upper surface of the ingot 10 can be efficiently guided to the light receiving unit 126 disposed at the second focal point 134 via the reflecting surface 129, and a reduction in loss of the weak fluorescence 122 can be achieved. Further, in the embodiment, the light receiving unit 126 is disposed at the second focal point 134, and therefore, detection sensitivity can be improved even for the fluorescence 122 of weak intensity.

The laser beam irradiating unit 140 depicted in FIG. 3 is a unit that irradiates the ingot 10 held on the holding surface 111 of the holding unit 110 with a pulsed laser beam 141 (see FIG. 9 and the like) of a predetermined wavelength. A part of the laser beam irradiating unit 140 is supported by the distal end of the support beam 103 extended in the horizontal direction from the upper end portion of the erected wall 102 erected from the apparatus main body 101. An irradiating section of the laser beam irradiating unit 140 is provided in such a manner as to be adjacent to an irradiating section of the fluorescence detecting unit 120.

The laser beam irradiating unit 140 forms a peeling layer 24 (see FIG. 10 and the like) by, for example, positioning a condensing point 142 (see FIG. 9 and the like) of the laser beam 141 having a wavelength transmissible through the ingot 10 at a depth corresponding to the thickness of a wafer 30 (see FIG. 11 and the like) to be produced from the upper surface of the ingot 10, and applying the laser beam 141.

The moving unit 150 is a unit that moves the holding unit 110 and the condensing point 142 of the laser beam 141 applied from the laser beam irradiating unit 140 relative to each other in an XY direction parallel with the holding surface 111. The moving unit 150 includes an X-axis direction moving unit 151 and a Y-axis direction moving unit 152.

The X-axis direction moving unit 151 is a unit that moves the holding unit 110 and the condensing point 142 of the laser beam 141 applied from the laser beam irradiating unit 140 relative to each other in the X-axis direction as a processing feed direction. The X-axis direction moving unit 151 in the embodiment moves the holding unit 110 in the X-axis direction. The X-axis direction moving unit 151 in the embodiment is installed on the apparatus main body 101 of the processing apparatus 100. The X-axis direction moving unit 151 supports the X-axis direction moving plate 113 movably in the X-axis direction.

The Y-axis direction moving unit 152 is a unit that moves the holding unit 110 and the condensing point 142 of the laser beam 141 applied from the laser beam irradiating unit 140 relative to each other in the Y-axis direction as an indexing feed direction. The Y-axis direction moving unit 152 in the embodiment moves the holding unit 110 in the Y-axis direction. The Y-axis direction moving unit 152 in the embodiment is installed on the apparatus main body 101 of the processing apparatus 100. The Y-axis direction moving unit 152 supports the Y-axis direction moving plate 114 movably in the Y-axis direction.

Each of the X-axis direction moving unit 151 and the Y-axis direction moving unit 152, for example, includes a well-known ball screw, a well-known pulse motor, and well-known guide rails. The ball screw is provided in such a manner as to be rotatable about an axis. The pulse motor rotates the ball screw about the axis. The guide rails of the X-axis direction moving unit 151 are provided in such a manner as to be fixed to the Y-axis direction moving plate 114. The guide rails of the X-axis direction moving unit 151 support the X-axis direction moving plate 113 movably in the X-axis direction. The guide rails of the Y-axis direction moving unit 152 are provided in such a manner as to be fixed to the apparatus main body 101. The guide rails of the Y-axis direction moving unit 152 support the Y-axis direction moving plate 114 movably in the Y-axis direction.

The moving unit 150 may further include a Z-axis direction moving unit that moves the holding unit 110 and the condensing point 142 of the laser beam 141 applied from the laser beam irradiating unit 140 relative to each other in the Z-axis direction as a focal point adjustment direction. The Z-axis direction moving unit moves a condenser of the laser beam irradiating unit 140 in the Z-axis direction.

In the embodiment, the irradiating section of the fluorescence detecting unit 120 is provided in such a manner as to be adjacent to the irradiating section of the laser beam irradiating unit 140. Hence, the moving unit 150 is also a unit that moves the holding unit 110 and the irradiation position of the exciting light 121 applied from the fluorescence detecting unit 120 relative to each other in the XY direction parallel with the holding surface 111.

The display unit 160 is a display unit constituted by a liquid crystal display apparatus or the like. The display unit 160, for example, displays, on a display surface, a processing condition setting screen, a state of the ingot 10 imaged by an imaging unit not depicted, a state of processing operation, two-dimensional data and three-dimensional data generated by the control unit 170 to be described later, and the like. Incidentally, the imaging unit, for example, includes a micro microscope and a macro microscope, and is provided in such a manner as to be adjacent to the irradiating sections of the fluorescence detecting unit 120 and the laser beam irradiating unit 140.

In a case where the display surface of the display unit 160 includes a touch panel, the display unit 160 may include an input unit. The input unit can receive various kinds of operation such as registration of processing content information by an operator and the like. The input unit may be an external input apparatus such as a keyboard. Information or an image displayed on the display surface of the display unit 160 is changed by operation from the input unit or the like. The display unit 160 may include a notifying apparatus. The notifying apparatus notifies of the operator of the processing apparatus 100 of predetermined notification information by emitting at least one of sound and light. The notifying apparatus may be an external notifying apparatus such as a speaker, or a light emitting apparatus.

The control unit 170 makes the processing apparatus 100 perform processing operation on the ingot 10 by controlling each of the above-described constituent elements of the processing apparatus 100. The control unit 170 is a computer including an arithmetic processing apparatus as arithmetic means, a storage apparatus as storing means, and an input-output interface apparatus as communicating means.

The arithmetic processing apparatus, for example, includes a microprocessor such as a central processing unit (CPU). The storage apparatus has a memory such as a read only memory (ROM) and a random access memory (RAM). The arithmetic processing apparatus performs various kinds of operation on the basis of a predetermined program stored in the storage apparatus. The arithmetic processing apparatus controls the processing apparatus 100 by outputting various kinds of control signals to the above-described constituent elements via the input-output interface apparatus according to a result of the operation.

The control unit 170, for example, makes the fluorescence detecting unit 120 irradiate the ingot 10 with the exciting light 121 of a predetermined wavelength from above the ingot 10 held by the holding unit 110. The control unit 170, for example, obtains the number of photons of the fluorescence 122 occurring from the upper surface of the ingot 10 which fluorescence is detected by the fluorescence detecting unit 120.

The control unit 170, for example, makes the moving unit 150 position the condensing point 142 of the laser beam 141 applied by the laser beam irradiating unit 140 at a depth corresponding to the thickness of a wafer 30 to be produced from the upper surface of the ingot 10 held by the holding unit 110. The control unit 170, for example, makes the laser beam irradiating unit 140 apply the laser beam 141 of a wavelength transmissible through the ingot 10 held by the holding unit 110. The control unit 170, for example, makes the moving unit 150 move the condensing point 142 of the laser beam 141 and the holding unit 110 holding the ingot 10 relative to each other in the XY direction.

The control unit 170, for example, makes the display unit 160 display various kinds of information and a processing result. The control unit 170, for example, makes the display unit 160 display two-dimensional data stored by a storage section 171 to be described later. The control unit 170, for example, makes the display unit 160 display three-dimensional data generated by a three-dimensional data generating section 172 to be described later. At this time, the control unit 170, for example, makes the display unit 160 display a boundary 25 (see FIG. 14) between the facet region 21 and the non-facet region 22 in the whole of the ingot 10. The control unit 170 includes the storage section 171 and the three-dimensional data generating section 172.

The storage section 171 stores a distribution of the number of photons of the fluorescence 122 on the upper surface of the ingot 10 which fluorescence is detected in the fluorescence detecting unit 120. At this time, the storage section 171 stores the distribution of the number of photons of the fluorescence 122 as two-dimensional data in association with XY coordinate positions on an XY plane parallel with the holding surface 111 of the holding unit 110. In addition, the storage section 171 stores, in association with the two-dimensional data, a Z-coordinate position as a position in a height direction of the ingot 10 at which position the two-dimensional data is obtained.

The storage section 171 sets a region in which the number of photons of the fluorescence 122 detected in the fluorescence detecting unit 120 is equal to or more than a predetermined value as the non-facet region 22, sets a region in which the number of photons of the fluorescence 122 is smaller than the predetermined value as the facet region 21, and stores the XY coordinate positions of the non-facet region 22 and the facet region 21.

The three-dimensional data generating section 172 generates three-dimensional data representing the distribution of the number of photons of the fluorescence 122 in the whole of the ingot 10 on the basis of the two-dimensional data at each Z-coordinate position of the ingot 10 which two-dimensional data is stored in the storage section 171.

(Processing Method for Ingot)

Figure 5:
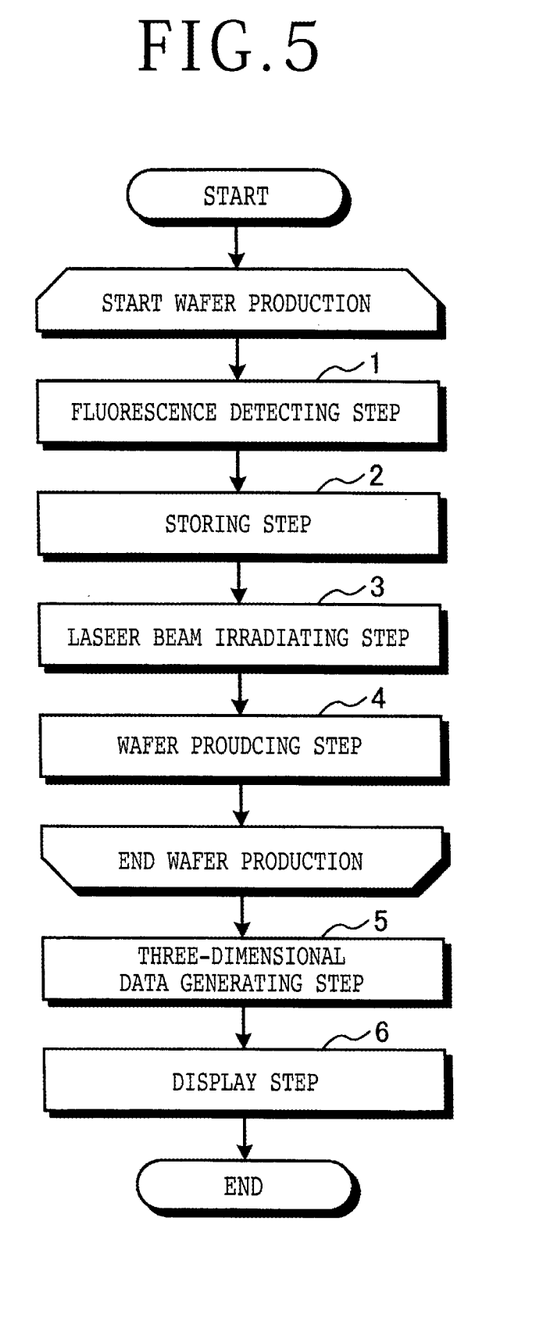
FIG. 5 is a flowchart diagram depicting a flow of the processing method for the ingot according to the embodiment.

A processing method for the ingot 10 according to the embodiment of the present invention will next be described. FIG. 5 is a flowchart diagram depicting a flow of the processing method for the ingot 10 according to the embodiment. The processing method for the ingot 10 includes a fluorescence detecting step 1, a storing step 2, a laser beam irradiating step 3, a wafer producing step 4, a three-dimensional data generating step 5, and a display step 6. The fluorescence detecting step 1, the storing step 2, the laser beam irradiating step 3, and the wafer producing step 4 are performed repeatedly while a plurality of wafers 30 are produced from one ingot 10.

<Fluorescence Detecting Step 1>

Figure 6:
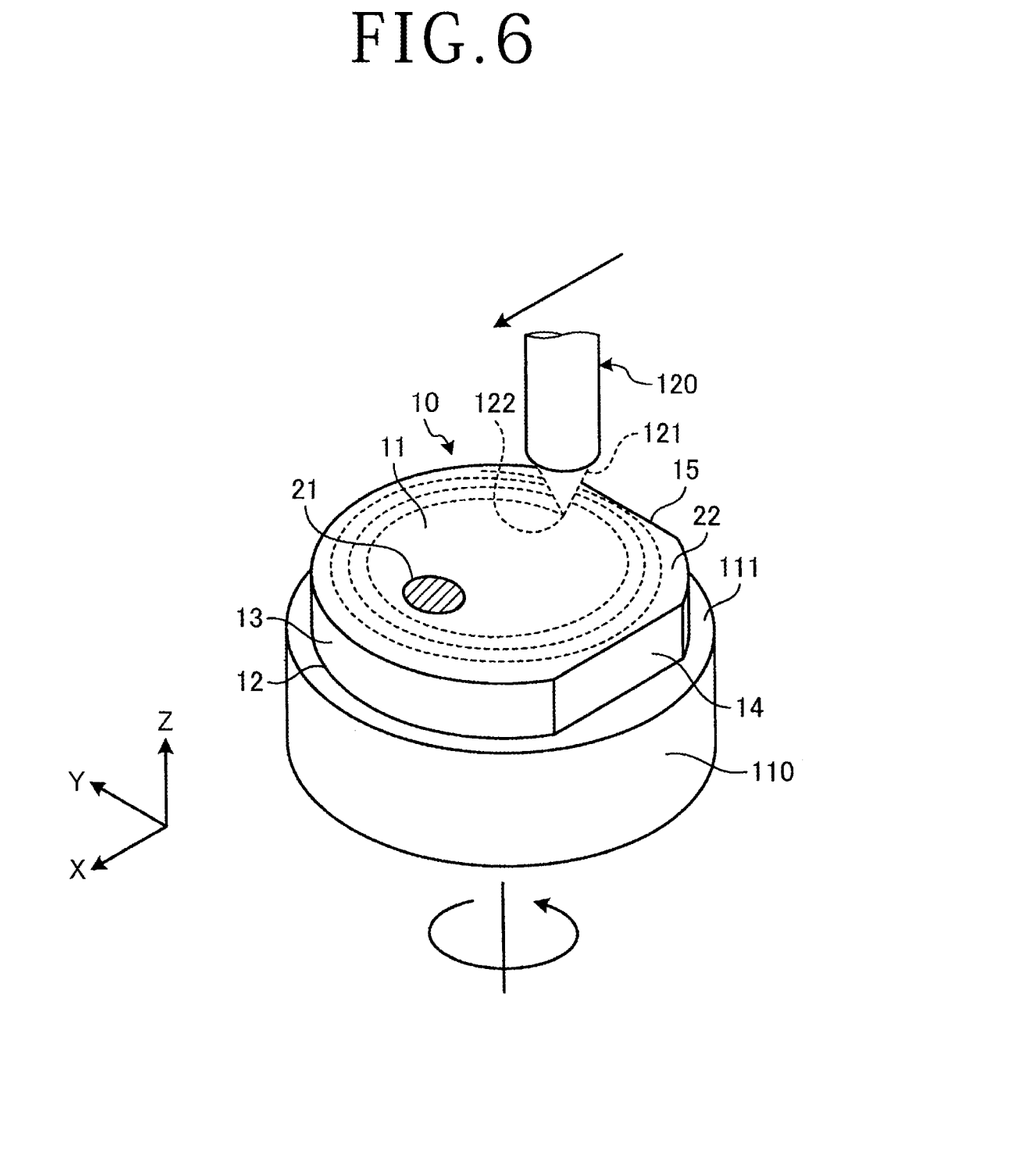
FIG. 6 is a perspective view depicting a fluorescence detecting step depicted in FIG. 5.

FIG. 6 is a perspective view depicting the fluorescence detecting step 1 depicted in FIG. 5. The fluorescence detecting step 1 is a step of irradiating the ingot 10 with the exciting light 121 of a predetermined wavelength from above the ingot 10, and detecting the number of photons of the fluorescence 122 occurring from the upper surface of the ingot 10.

In the fluorescence detecting step 1, first, the second surface 12 side of the ingot 10 is sucked and held by the holding surface 111 of the holding unit 110. Next, the height of the fluorescence detecting unit 120 is adjusted such that the first focal point 133 (see FIG. 4) of the fluorescence detecting unit 120 is located at the first surface 11 of the ingot 10, and the holding unit 110 is moved by the moving unit 150 such that the irradiating section of the fluorescence detecting unit 120 is opposed to a peripheral edge of the first surface 11 of the ingot 10.

In this state, the rotating unit 112 rotates the holding unit 110 at a predetermined rotational speed (for example, 900°/sec), and thereby rotates the ingot 10 in a predetermined direction (arrow direction depicted in a lower portion of FIG. 6). As depicted in FIG. 6, the holding unit 110 is moved such that the fluorescence detecting unit 120 moves in a radial direction (arrow direction depicted in an upper portion of FIG. 6) from the peripheral edge to a center of the ingot 10 while the exciting light 121 is continuously applied from the fluorescence detecting unit 120 to the upper surface (first surface 11) of the ingot 10. Then, the fluorescence detecting unit 120 passes along a spiral trajectory from the peripheral edge to the center of the ingot 10.

The fluorescence detecting step 1 obtains the number of photons of the fluorescence 122 occurring from the upper surface of the ingot 10 and obtains the XY coordinate positions of the position irradiated with the exciting light 121 at a time of obtaining the fluorescence 122.

<Storing Step 2>

Figure 7:
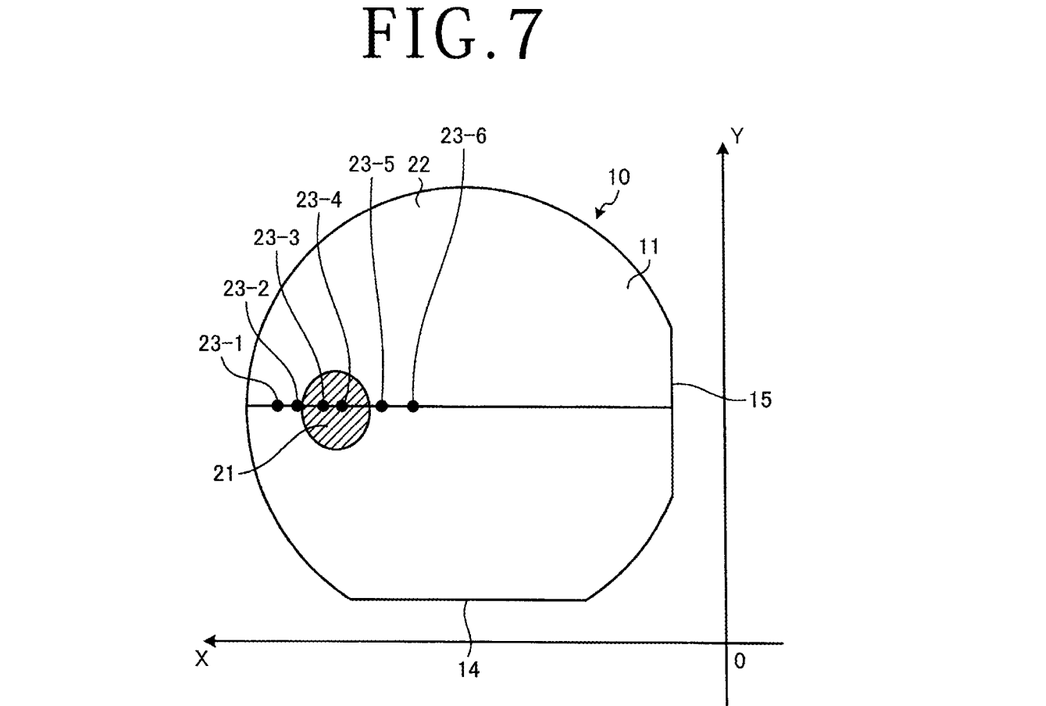
FIG. 7 is a diagram depicting an example of XY coordinate positions at which fluorescence is detected in the fluorescence detecting step depicted in FIG. 5.
Figure 8:
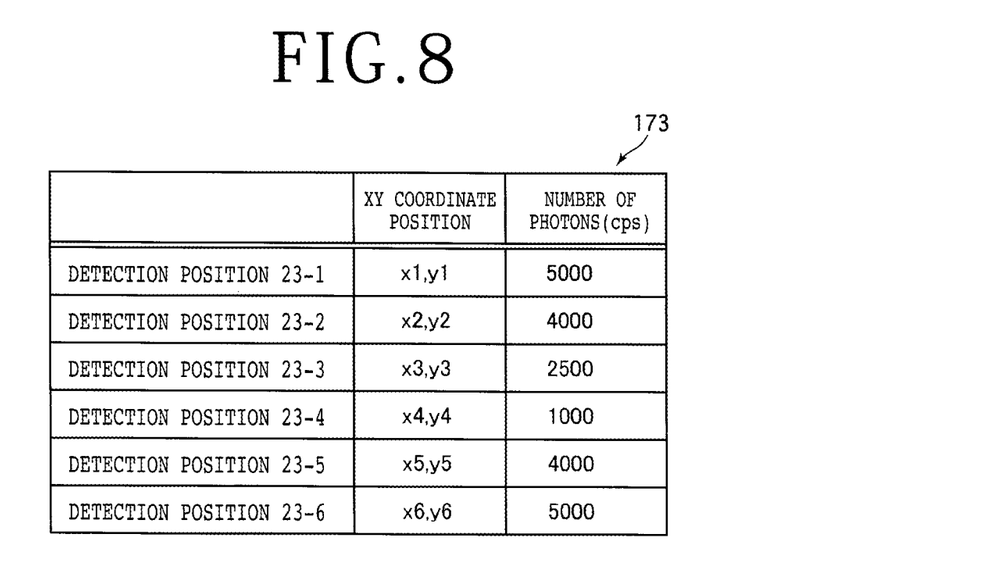
FIG. 8 is a diagram depicting an example of two-dimensional data stored in a storing step depicted in FIG. 5.

FIG. 7 is a diagram depicting an example of the XY coordinate positions at which the fluorescence 122 is detected in the fluorescence detecting step 1 depicted in FIG. 5. FIG. 8 is a diagram depicting an example of the two-dimensional data stored in the storing step 2 depicted in FIG. 5. The storing step 2 is a step of storing the distribution of the number of photons of the fluorescence 122 on the upper surface of the ingot 10 which fluorescence is detected in the fluorescence detecting step 1, as two-dimensional data in association with the XY coordinate positions, and storing the Z-coordinate position of the ingot 10 at which position the two-dimensional data is obtained in association with the two-dimensional data.

In the storing step 2, for detection positions 23-1, 23-2, 23-3, 23-4, and 23-5 depicted in FIG. 7, for example, the XY coordinate positions of the respective detection positions and the numbers of photons (count per second: cps) of the fluorescence 122 detected at the respective detection positions are stored as two-dimensional data 173, as depicted in FIG. 8. The storing step 2 stores the Z-coordinate position of the ingot 10 at which position the two-dimensional data 173 depicted in FIG. 8 is obtained in the storage section 171 of the control unit 170 in association with the two-dimensional data 173.

The storing step 2 according to the embodiment stores the XY coordinate positions of the facet region 21 and the non-facet region 22. The facet region 21 is a region in which the number of photons of the fluorescence 122 detected in the fluorescence detecting step 1 is smaller than the predetermined value. The non-facet region 22 is a region in which the number of photons of the fluorescence 122 detected in the fluorescence detecting step 1 is equal to or more than the predetermined value. As in the embodiment depicted in FIG. 7 and FIG. 8, in a case where the predetermined value is set at 4000, the detection positions 23-3 and 23-4 are in the facet region 21, and the detection positions 23-1, 23-2, and 23-5 are in the non-facet region 22.

<Laser Beam Irradiating Step 3>

Figure 9:
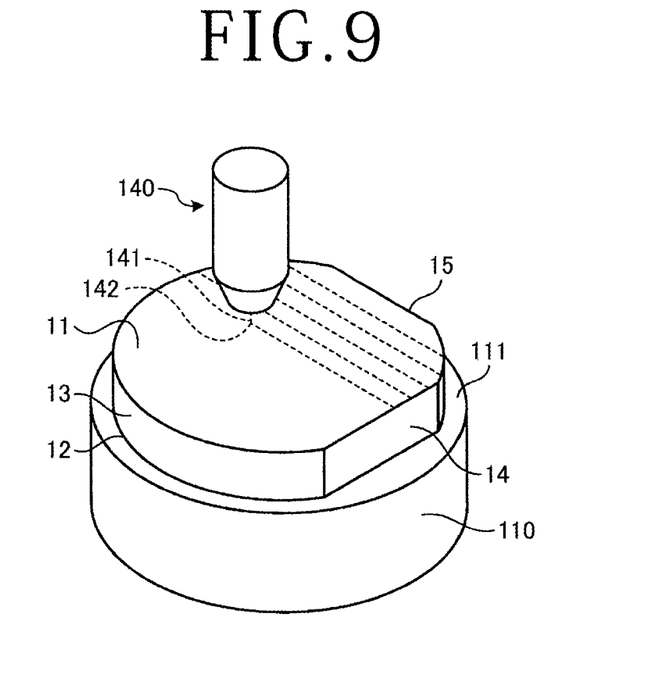
FIG. 9 is a perspective view depicting a laser beam irradiating step depicted in FIG. 5.
Figure 10:
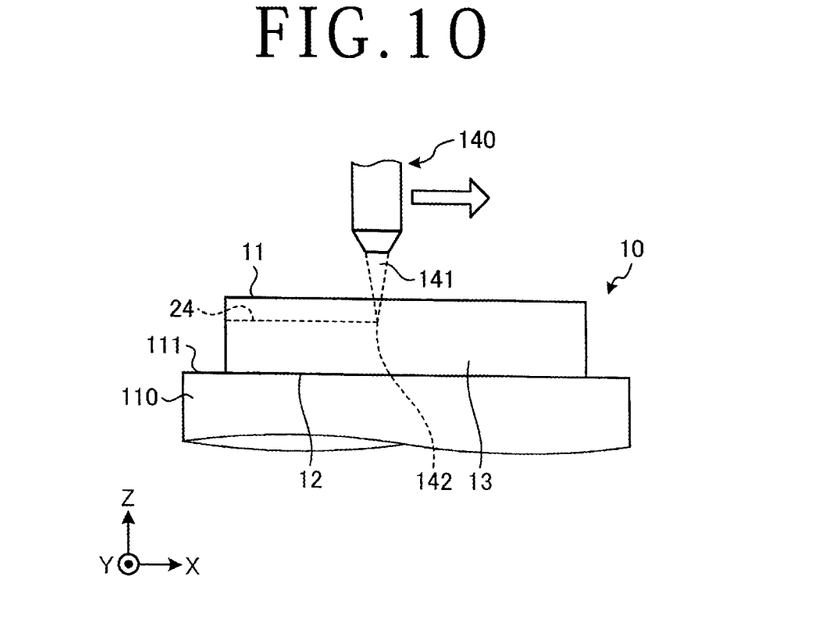
FIG. 10 is a side view of FIG. 9.

FIG. 9 is a perspective view depicting the laser beam irradiating step 3 depicted in FIG. 5. FIG. 10 is a side view of FIG. 9. The laser beam irradiating step 3 is performed after the storing step 2. The laser beam irradiating step 3 is a step of forming a peeling layer 24 at a depth corresponding to the thickness of a wafer 30 to be produced from the upper surface of the ingot 10.

In the laser beam irradiating step 3, the sucking and holding of the second surface 12 side of the ingot 10 on the holding surface 111 of the holding unit 110 is continued from the fluorescence detecting step 1. The laser beam irradiating step 3 first positions the condensing point 142 of the laser beam 141 at a depth corresponding to the thickness of a wafer 30 (see FIG. 11) to be produced from the upper surface of the ingot 10. The laser beam 141 is a pulsed laser beam of a wavelength transmissible through the ingot 10. The laser beam irradiating step 3 next irradiates the ingot 10 with the laser beam 141 while moving the condensing point 142 and the ingot 10 relative to each other in the XY direction.

The laser beam irradiating step 3 separates SiC into silicon (Si) and carbon (C) by the application of the pulsed laser beam 141. Then, a modified portion in which the pulsed laser beam 141 applied next is absorbed by C formed previously and SiC is separated into Si and C in a chained manner is formed within the ingot 10 along the processing feed direction, and a crack extending from the modified portion along the c-plane 19 (see FIG. 2) is generated. The laser beam irradiating step 3 thus forms the peeling layer 24 including the modified portion and the crack including the modified portion along the c-plane 19.

<Wafer Producing Step 4>

Figure 11:
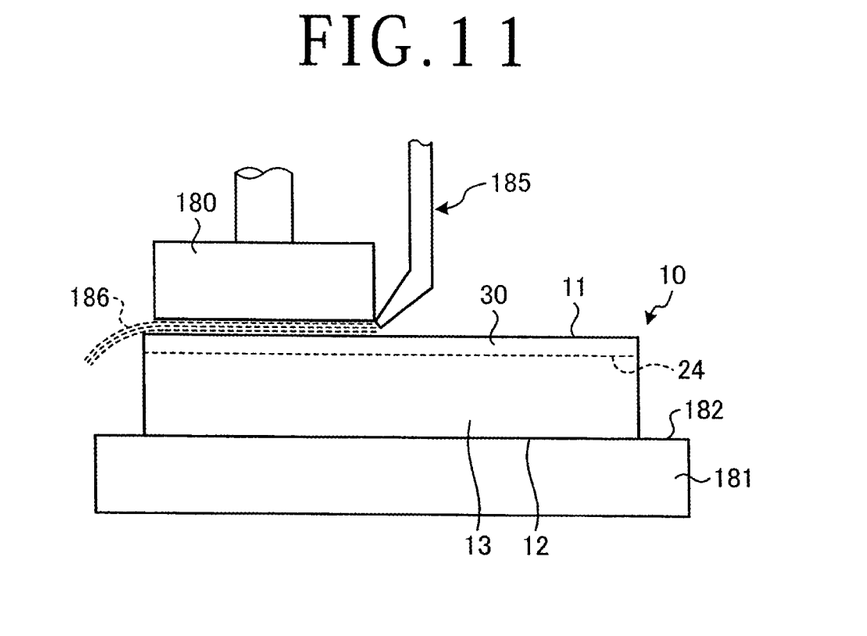
FIG. 11 is a diagram depicting one state of a wafer producing step depicted in FIG. 5.
Figure 12:
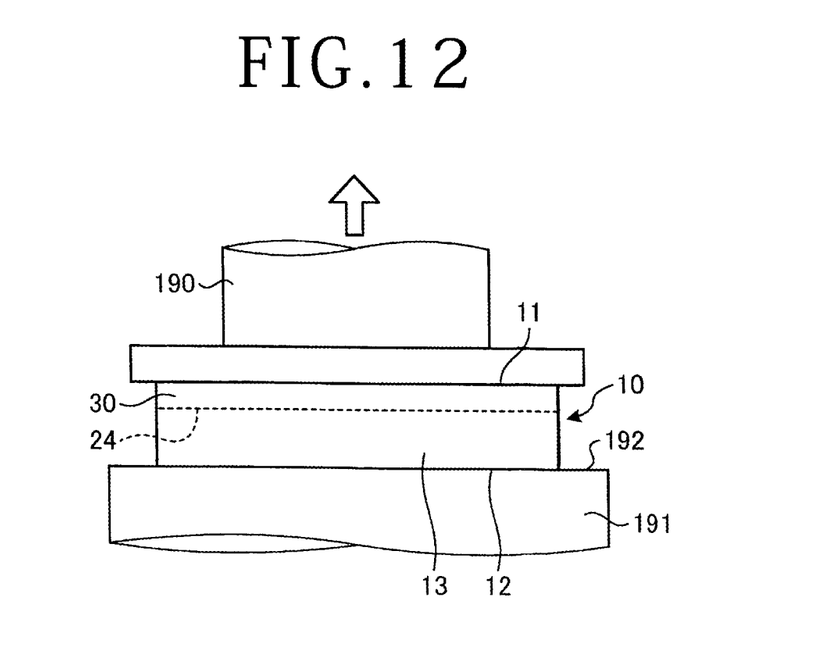
FIG. 12 is a diagram depicting one state of the wafer producing step depicted in FIG. 5 after that illustrated in FIG. 11.

FIG. 11 is a diagram depicting one state of the wafer producing step 4 depicted in FIG. 5. FIG. 12 is a diagram depicting one state of the wafer producing step 4 depicted in FIG. 5 after that illustrated in FIG. 11. The wafer producing step 4 is a step of separating the wafer 30 from the ingot 10 with the peeling layer 24 formed in the laser beam irradiating step 3 as a starting point.

The wafer producing step 4 applies an ultrasonic wave to the ingot 10 by an ultrasonic oscillating unit 180, and peels off the wafer 30 from the ingot 10 by a peeling unit 190. Consequently, a part on the first surface 11 side of the ingot 10 is peeled with the peeling layer 24 as an interface, and the peeled part is produced as a wafer 30. The ultrasonic oscillating unit 180, for example, includes an ultrasonic power supply and an ultrasonic vibrator formed by a piezoelectric ceramic or the like to which a voltage is applied by the ultrasonic power supply.

The wafer producing step 4 first sucks and holds the second surface 12 side of the ingot 10 on a holding surface 182 of a holding unit 181. Next, the ultrasonic vibrator of the ultrasonic oscillating unit 180 is opposed to the first surface 11 of the ingot 10. Next, liquid 186 is supplied between the ultrasonic vibrator and the ingot 10 from a liquid supply unit 185.

In this state, the ultrasonic vibrator is ultrasonically vibrated by applying a voltage from the ultrasonic power supply of the ultrasonic oscillating unit 180. An ultrasonic vibration of a frequency corresponding to the vibration of the ultrasonic vibrator is thereby propagated within the liquid 186 and applied to the ingot 10. When the ultrasonic vibration is applied to the entire surface of the ingot 10, a part on the first surface 11 side of the ingot 10 is peeled off with the peeling layer 24 formed in the laser beam irradiating step 3 as an interface.

The wafer producing step 4 next sucks and holds the second surface 12 side of the ingot 10 on a holding surface 192 of a holding unit 191. Next, the peeling unit 190 holds the first surface 11 side of the ingot 10. Next, the peeling unit 190 is raised upward, and thereby the ingot 10 is pulled upward and downward, so that the ingot 10 is separated with the peeling layer 24 as an interface. Consequently, a peeled part on the first surface 11 side of the ingot 10 is produced as a wafer 30.

<Three-Dimensional Data Generating Step 5>

Figure 13:
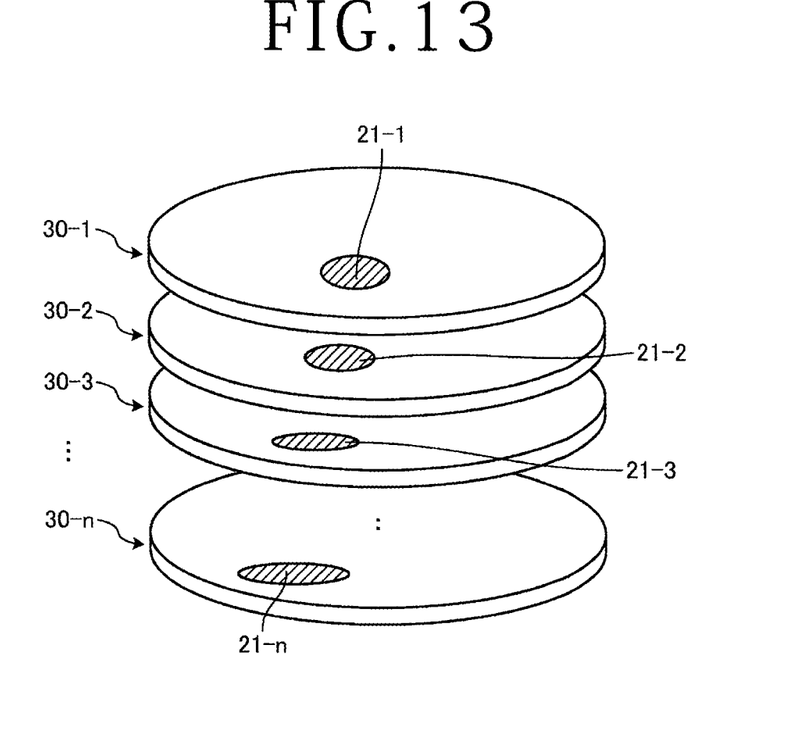
FIG. 13 is a schematic diagram of a plurality of pieces of two-dimensional data accumulated before a three-dimensional data generating step depicted in FIG. 5 is performed.
Figure 14:
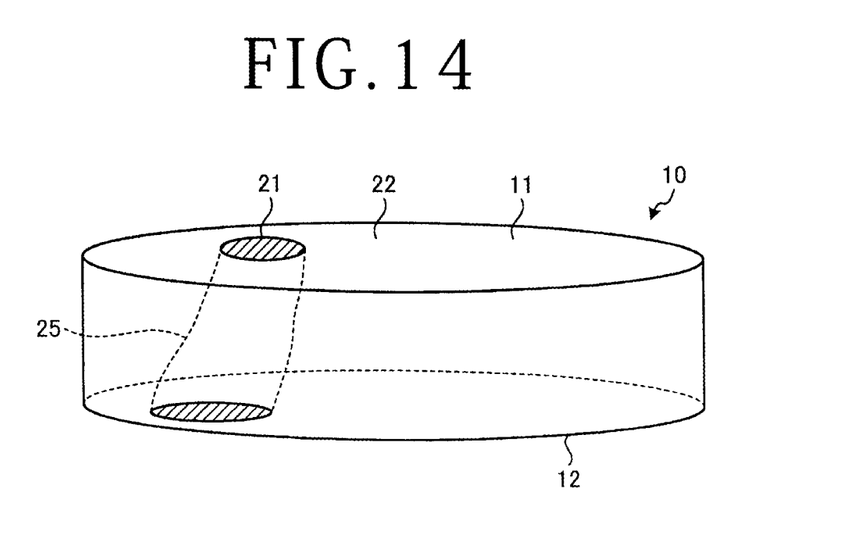
FIG. 14 is a schematic diagram of three-dimensional data generated in the three-dimensional data generating step depicted in FIG. 5.

FIG. 13 is a schematic diagram of a plurality of pieces of two-dimensional data accumulated before the three-dimensional data generating step 5 depicted in FIG. 5. FIG. 14 is a schematic diagram of three-dimensional data generated in the three-dimensional data generating step 5 depicted in FIG. 5. The three-dimensional data generating step 5 is performed after a plurality of wafers 30 are produced from the ingot 10 by repeatedly performing the fluorescence detecting step 1, the storing step 2, the laser beam irradiating step 3, and the wafer producing step 4. The three-dimensional data generating step 5 is a step of generating three-dimensional data representing the distribution of the number of photons of the fluorescence 122 in the whole of the ingot 10 on the basis of the two-dimensional data at each Z-coordinate position of the ingot 10 which two-dimensional data is stored in the storing step 2.

As depicted in FIG. 13, the processing method for the ingot 10 according to the embodiment produces n wafers 30-1, 30-2, 30-3, . . . , 30-n peeled from the ingot 10. With regard to the n wafers 30-1, 30-2, 30-3, . . . , 30-n, the storage section 171 of the control unit 170 stores data on the respective Z-coordinate positions and the two-dimensional data (for example the two-dimensional data 173 depicted in FIG. 8) in association with each other.

In the three-dimensional data generating step 5, the three-dimensional data generating section 172 of the control unit 170 generates three-dimensional data representing the distribution of the number of photons of the fluorescence 122 in the whole of the ingot 10 from the respective Z-coordinate positions of the n wafers 30-1, 30-2, 30-3, . . . , 30-n and the respective pieces of two-dimensional data corresponding thereto.

In the embodiment, with regard to the n wafers 30-1, 30-2, 30-3, . . . , 30-n, the storage section 171 stores data on the XY coordinate positions of facet regions 21-1, 21-2, 21-3, . . . , 21-n corresponding to the respective Z-coordinate positions. In the embodiment, as depicted in FIG. 14, three-dimensional data representing a boundary 25 between the facet region 21 and the non-facet region 22 is generated from the respective Z-coordinate positions of the n wafers 30-1, 30-2, 30-3, . . . , 30-n and the XY coordinate positions of the facet regions 21-1, 21-2, 21-3, . . . , 21-n.

<Display Step 6>

The display step 6 is a step of displaying the three-dimensional data. In the embodiment, the three-dimensional data is displayed on the display surface of the display unit 160. The display step 6, for example, visually displays the three-dimensional data as a three-dimensional model. The display step 6, for example, displays the boundary between the facet region 21 and the non-facet region 22 in the whole of the ingot 10 as a three-dimensional model as depicted in FIG. 14.

As described above, the processing method for the ingot 10 according to the embodiment obtains the distribution of the number of photons of the fluorescence 122 on the upper surface of the ingot 10 by detecting the number of photons of the fluorescence 122 at a time of irradiating the upper surface of the ingot 10 with the exciting light 121 before forming a peeling layer 24 for peeling the wafer 30 from the ingot 10. Then, when each of the plurality of wafers 30 is repeatedly produced, the distribution of the number of photons of the fluorescence 122 on the upper surface of the ingot 10 is obtained. The three-dimensional data representing the distribution of the number of photons of the fluorescence 122 in the whole of the ingot 10 is thereby generated.

Hence, the processing method for the ingot 10 according to the embodiment enables the facet region 21 having a different impurity concentration within the ingot 10 to be recognized three-dimensionally at the same time as completion of cutting out of the plurality of wafers 30 from the ingot 10. Thus, an effect is produced in that swift and appropriate feedback to a crystal growth process is made possible.

It is to be noted that the present invention is not limited to the foregoing embodiment. That is, the present invention can be variously modified and carried out without departing from the gist of the present invention. For example, the laser beam irradiating step 3 may subject only the facet region 21 to processing under different laser processing conditions on the basis of the two-dimensional data stored in the storing step 2. For example, the height (Z-direction position) of the condensing lens that condenses the laser beam 141 may be changed between the facet region 21 and the non-facet region 22 such that the position of the condensing point 142 in the thickness direction of the ingot 10 is constant.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing method for an ingot, the processing method comprising:
   a fluorescence detecting step of irradiating the ingot with exciting light of a predetermined wavelength from above the ingot and detecting the number of photons of fluorescence occurring from an upper surface of the ingot;
   a storing step of storing a distribution of the number of photons of the fluorescence on the upper surface of the ingot, the fluorescence being detected in the fluorescence detecting step, as two-dimensional data in association with XY coordinate positions on an XY plane orthogonal to a height direction of the ingot, and storing a Z-coordinate position at which the two-dimensional data is obtained, the Z-coordinate position being a position in the height direction of the ingot, in association with the two-dimensional data;
   a laser beam irradiating step of, after the storing step, forming a peeling layer in the ingot by irradiating the ingot with a laser beam of a wavelength transmissible through the ingot while positioning a condensing point of the laser beam at a depth corresponding to a thickness of a wafer to be produced, from the upper surface of the ingot, and moving the condensing point and the ingot relative to each other in an XY direction;
   a wafer producing step of separating the wafer from the ingot with the peeling layer formed in the laser beam irradiating step, as a starting point; and
   a three-dimensional data generating step of generating three-dimensional data representing the distribution of the number of photons of the fluorescence in a whole of the ingot, on a basis of two-dimensional data at each Z-coordinate position of the ingot, the two-dimensional data being stored in the storing step, after producing a plurality of wafers from the ingot by repeating the fluorescence detecting step, the storing step, the laser beam irradiating step, and the wafer producing step.

2. The processing method for an ingot according to claim 1, further comprising:
   a display step of displaying the three-dimensional data.

3. The processing method for an ingot according to claim 2, wherein
   the storing step sets a region in which the number of photons of the fluorescence detected in the fluorescence detecting step is equal to or more than a predetermined value as a non-facet region, sets a region in which the number of photons of the fluorescence is smaller than the predetermined value as a facet region, and stores XY coordinate positions of the non-facet region and the facet region, and
   the display step displays a boundary between the facet region and the non-facet region in the whole of the ingot.

* * * * *